J. W. OFFUTT.
STERILIZING APPARATUS.
APPLICATION FILED DEC. 10, 1909.
1,046,842.
Patented Dec. 10, 1912.
4 SHEETS—SHEET 3.
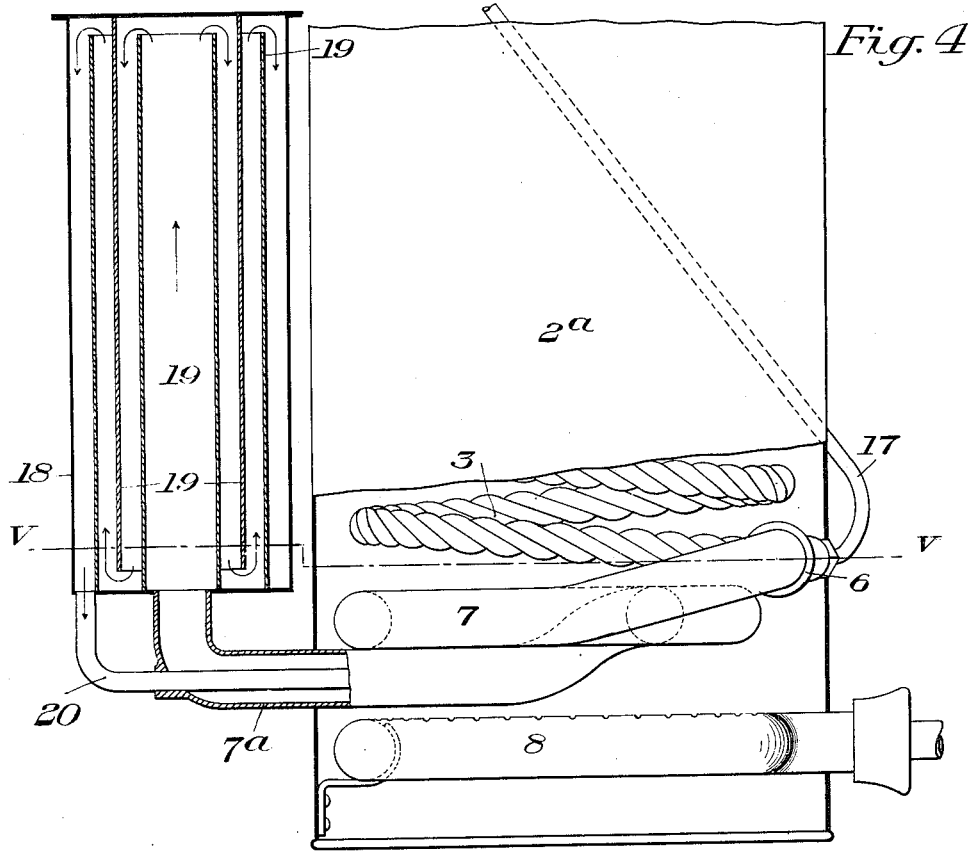
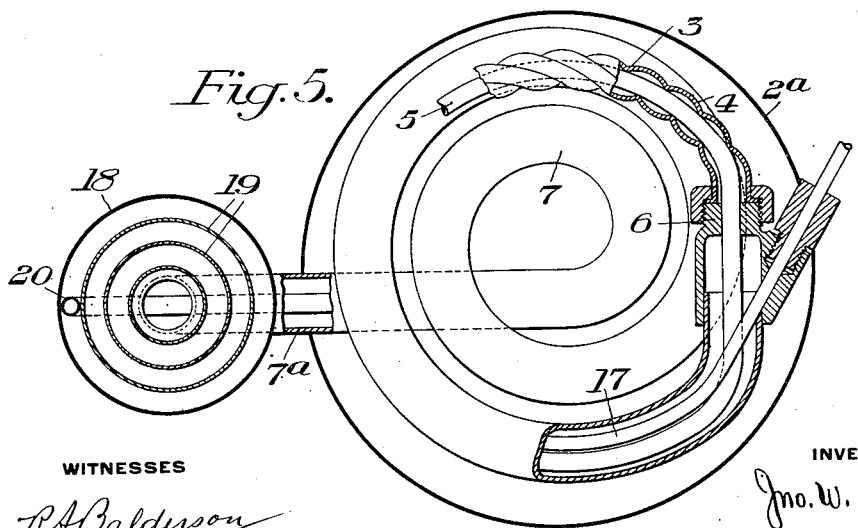
WITNESSES
INVENTOR

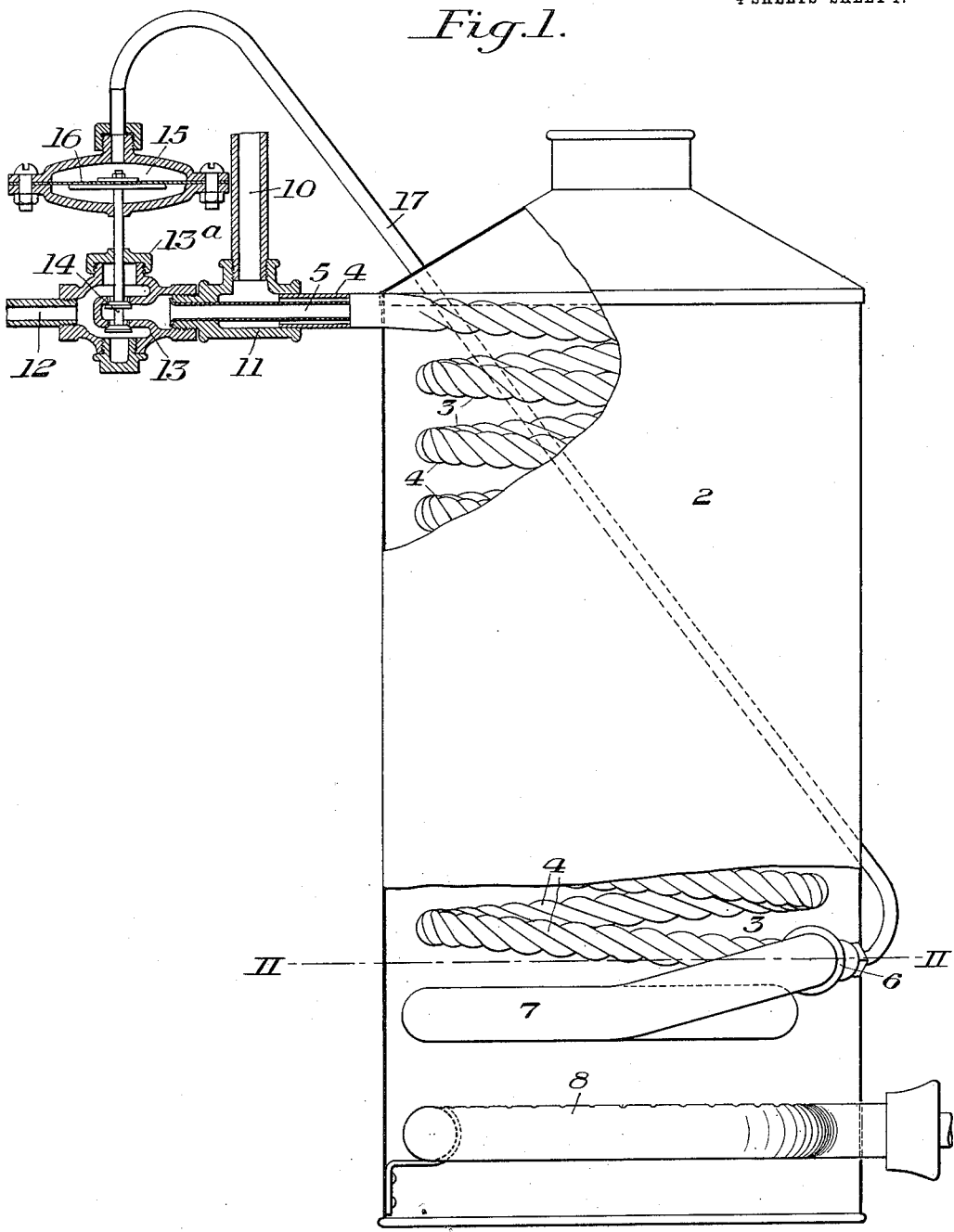

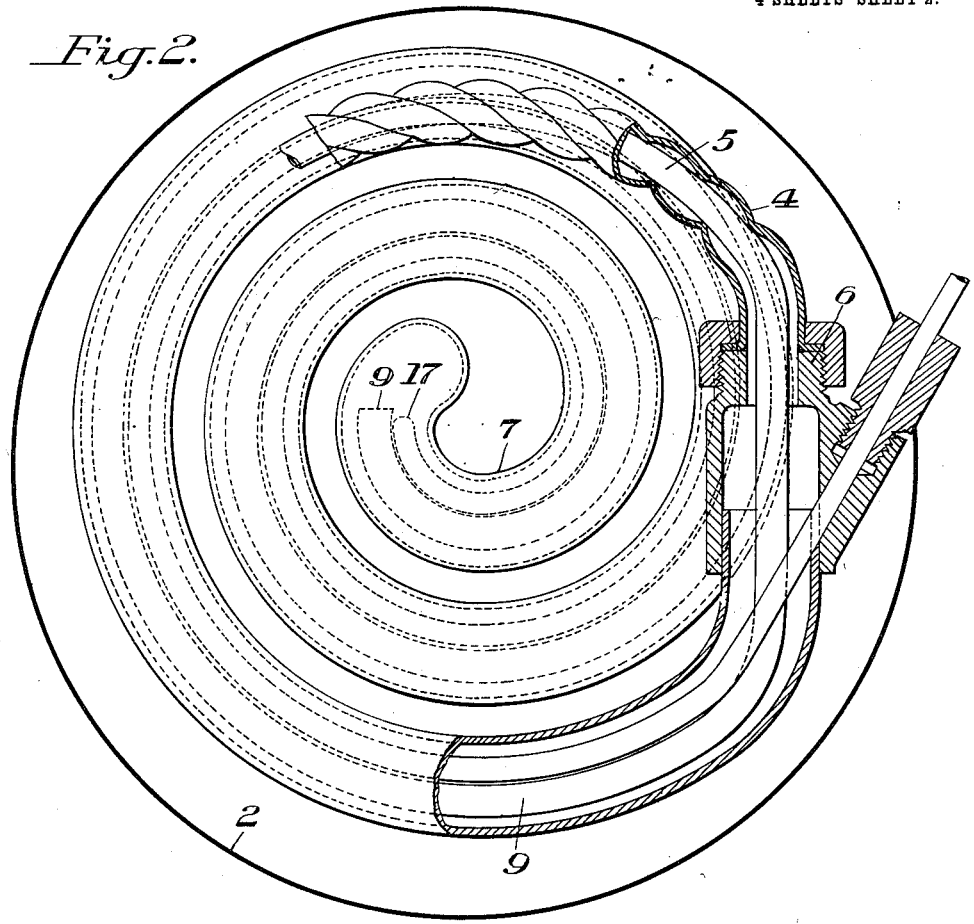
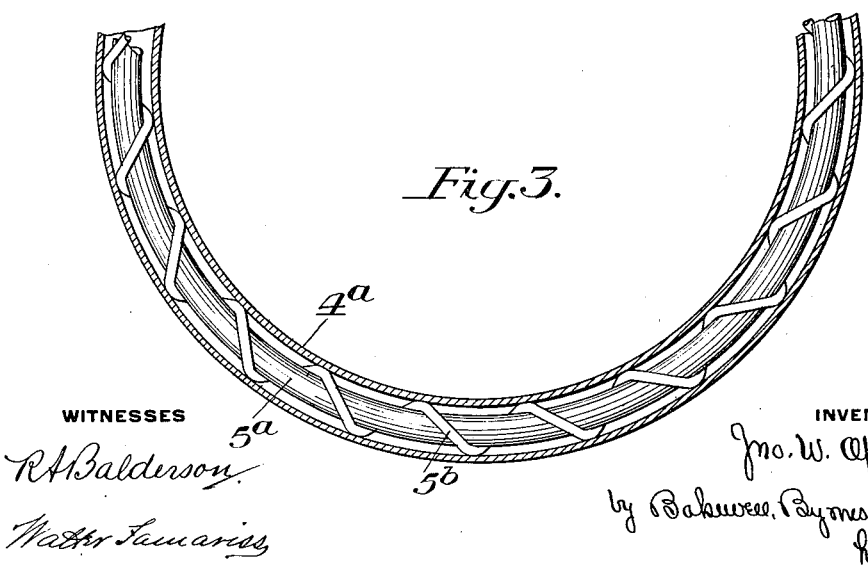

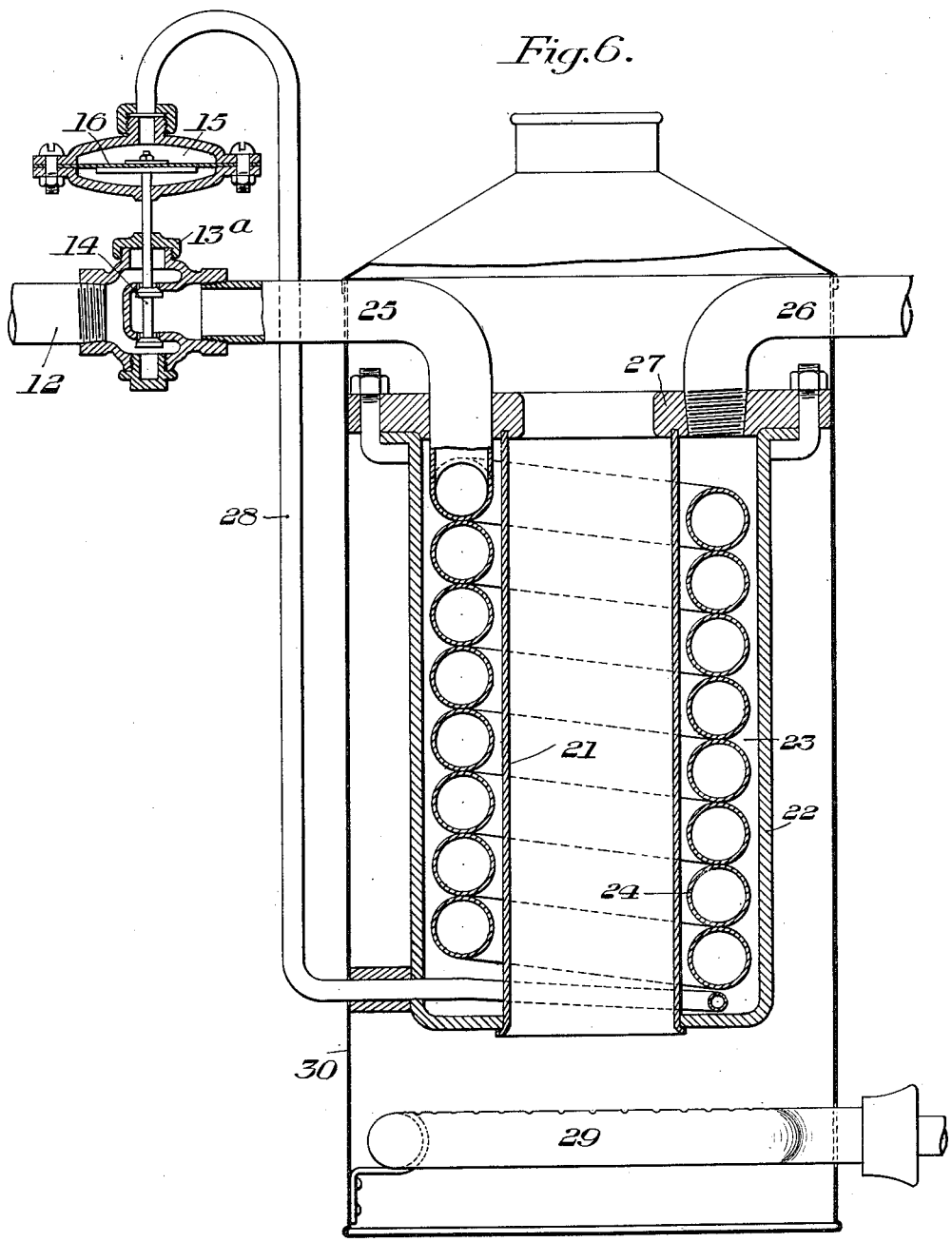

UNITED STATES PATENT OFFICE.

JOHN W. OFFUTT, OF ELLWOOD CITY, PENNSYLVANIA, ASSIGNOR OF ONE-HALF TO JOHN H. NICHOLSON, OF PITTSBURGH, PENNSYLVANIA.

STERILIZING APPARATUS.

1,046,842.  Specification of Letters Patent.  Patented Dec. 10, 1912.

Application filed December 10, 1909. Serial No. 532,390.

*To all whom it may concern:*

Be it known that I, JOHN W. OFFUTT, of Ellwood City, Lawrence county, Pennsylvania, have invented a new and useful Sterilizing Apparatus, of which the following is a full, clear, and exact description, reference being had to the accompanying drawings, forming part of this specification.

My invention has relation to sterilizing apparatus, and more particularly to apparatus for sterilizing water.

The objects of my invention are to provide a simple and compact, cheap and efficient form of apparatus for sterilizing water, in which the flow of water is automatically regulated.

A further object is to provide a sterilizer of this kind, in which the only regulation necessary is heat regulation; which will be economical in operation; which will afford a constant supply of sterilized water; and also to provide apparatus of this character which will deliver sterilized water only a few degrees warmer than the water supply.

The nature of my invention will be best understood from the accompanying drawings, in which I have shown different forms thereof, and which will now be described, it being premised, however, that the invention is susceptible to other embodiments, and that various changes may be made in the details of construction and arrangement of the parts by those skilled in the art without departing from the spirit and scope of my invention as defined in the appended claims.

In the drawings Figure 1 is a side elevation partly in section and partly broken away of one form of apparatus embodying my invention; Fig. 2 is a section on the line II—II of Fig. 1 on a larger scale and partially broken away; Fig. 3 is a detail sectional view showing a modification; Fig. 4 is a view partly in side elevation and partly in section, and partly broken away showing another modification; Fig. 5 is a section on the line V—V of Fig. 4 and partly broken away; and Fig. 6 is a view similar to Fig. 1 showing another modification.

Referring first to the form of my invention shown in Figs. 1 and 2, the numeral 2 designates a casing, preferably of sheet metal, and which may be of any desired shape and capacity. Placed within this casing is a heating coil 3, which consists of an outer tube 4 and an inner tube 5 extending entirely through the outer tube. After the inner tube is placed within the outer tube in the construction of the apparatus, the outer tube is corrugated or roped in the manner indicated in the drawing, thereby bringing the outer tube in contact with the inner tube in a number of helical lines, leaving intervening spaces in the form of helical passages for the circulation of the water or other liquid to be sterilized. The coil is then formed in any desired shape and size.

The coil 3 is connected at its lower end by a fitting 6 with another coil 7 which is placed above a burner or other heating device 8. This coil also consists of outer and inner tubes, as shown in Fig. 2, but the outer tube is not corrugated. The inner tube 9 forms a continuation of the inner tube 5, and its inner end, which terminates at the inner end of the coil 7, is open, as indicated at 9.

10 designates a water supply connection which communicates with the outer end of the heating coil by means of a coupling 11. The inner tube 5 extends through this coupling, and communicates with a discharge pipe 12 through a valve casing 13 having a control valve 14 therein. The stem of this valve is extended outwardly through the cap 13$^a$ of the casing, and enters a diaphragm chamber 15 having therein a diaphragm 16. Connecting with the portion of the diaphragm chamber above the diaphragm is a thermostat tube 17, whose lower end is extended into the coil 7 through the coupling or fitting 6. This thermostat tube is carried around through the convolutions of the coil 7, as shown in Fig. 2, and its lower end is closed as indicated at 17 in Fig. 2. This tube and the diaphragm chamber are filled with water or other liquid, and when the apparatus is not in operation it is under no pressure.

The operation is as follows:—The water enters the heating coil through the coupling 11 and circulates through the helical passages between the inner and outer tubes, flowing downwardly until it reaches the inner end of the lower coil 7. It then enters the open end of the inner tube 9 and passes back through said tube to the regulating valve 14. By means of heat applied to the coil 7, the water in this coil is brought to a boiling temperature; and assuming that the water supply is under ordinary service pressure the temperature will rise above 212 derees. The water or other liquid in the thermostatic tube, being under no pressure, will be turned into steam, thus setting up a pressure. This pressure acts on the diaphragm 16, and thereby actuates the valve stem to open the valve 14, allowing the water to pass through to the discharge pipe 12. This causes a flow in the heating coil, and as soon as this flow begins, cold water continues to pass through the outer tube and the heated water to flow upward through the inner tube, the heated water giving up the greater part of its heat to the inflowing cold water. In this manner the sterilized water discharged is at a temperature but little higher than that of the incoming supply water. When the water in the coil drops in temperature, the liquid in the thermostatic tube will be cooled off, thus releasing the pressure of the diaphragm chamber and causing the valve 14 to close.

In practice, it is found that when the gas supply is kept constant, the valve 14 will adjust itself to the proper flow, and the flow of water is substantially constant. The helical path provided by the corrugating of the outer pipe not only holds the incoming water within the coils and increases the area of contact with the heated inner tube; but the helical passages exert a centrifugal action on the flowing water, which results in a more uniform heating. The casing 2 serves to confine the heat and also give the device better appearance. It will be understood, however, that the heating coil may be uninclosed if desired, or that any suitable form of closure may be provided therefor; and also that the form of heating coil may be varied as may be desired.

In the modification shown in Fig. 3, instead of roping or corrugating the outer tube or pipe 4ª of the heating coil, I wind the inner pipe or tube 5ª with a helical wire b, this wire serving not only to center the inner pipe or tube within the outer one, but also forms helical passages for the water.

In the modification shown in Figs. 4 and 5, the construction is the same as that shown in Fig. 1 except that I provide a sediment reservoir 18. This reservoir may be placed adjacent to the casing 2ª, and may be connected with an extension 7ª of the lower coil 7, in the manner shown in Figs. 4 and 5. Within the reservoir 18 I preferably provide a series of concentric tubes or baffles 19 so as to cause a longer path for the circulation of the liquid therein, as shown by the arrows. The inner pipe or tube of the heating coil is also provided with an extension 20, which communicates with the interior of the sediment reservoir, so that the water after flowing up and down between the several tubes or baffles 19 finally enters this pipe and passes back through the heating coils. I have found that by providing this reservoir, the water is allowed to cool somewhat therein, which causes a precipitation or deposit of the contained sediment. This reservoir may be provided with suitable doors or other means so that the baffles 19 can be readily removed and access had to the interior for cleaning whenever desired.

In the modification shown in Fig. 6, I have shown a somewhat different construction. In this form, I provide a casing composed of an inner shell 21 and an outer shell 22 with an annular space 23 between the shells. In this space I place a helical heating coil 24, which has the circulating connection 25 at one end. The other end of the coil is open and communicates with the space 23, a circulating connection 26 leading into said space through a removable cover 27.

28 designates a thermostatic tube similar to the tube 17 first described, and which controls an outlet valve in the same manner as shown in Fig. 1. In this construction water may either come in at the connection 25 and circulate through the coil and thence rise in the annular space 23 and be discharged at the connection 26; or the cold water may enter at 26 and pass downwardly around the coil and thence into the coil and be discharged at the connection 25.

29 indicates a gas burner placed below the apparatus, the inner tube 21 acting as a flue or chimney. An outer inclosing casing 30 may also be provided.

What I claim is:—

1. In sterilizing apparatus, a heating device comprising inner and outer tubes formed into a coil having a helical passage between them, a supplementary heating coil connected to the lower end of the first named coil, a valve for controlling the outlet from the inner tube, a diaphragm for actuating said valve, and a thermostatic tube extending from the diaphragm chamber into the supplementary heating coil; substantially as described.

2. In sterilizing apparatus, a heating device comprising a coil consisting of inner and outer tubes, the outer tube being corrugated, a supplementary heating coil having an inner tube forming an extension of the tube of the first named coil, a valve for controlling the discharge from the inner tube, and means extending within the supplementary coil for controlling said valve; substantially as described.

In testimony whereof, I have hereunto set my hand.

J. W. OFFUTT.

Witnesses:
H. M. CORWIN,
GEO. H. PARMELEE.